(12) United States Patent
Suetsugu et al.

(10) Patent No.: US 9,214,675 B2
(45) Date of Patent: Dec. 15, 2015

(54) ELECTROLYTIC MANGANESE DIOXIDE AND METHOD FOR PRODUCING SAME, AND METHOD FOR PRODUCING LITHIUM-MANGANESE COMPLEX OXIDE

(75) Inventors: Kazumasa Suetsugu, Shunan (JP); Hiroshi Miura, Shunan (JP)

(73) Assignee: TOSOH CORPORATION, Yamaguchi (JP)

( * ) Notice: Subject to any disclaimer, the term of this patent is extended or adjusted under 35 U.S.C. 154(b) by 126 days.

(21) Appl. No.: 13/994,544

(22) PCT Filed: Feb. 16, 2012

(86) PCT No.: PCT/JP2012/053699
§ 371 (c)(1),
(2), (4) Date: Jun. 14, 2013

(87) PCT Pub. No.: WO2012/111766
PCT Pub. Date: Aug. 23, 2012

(65) Prior Publication Data
US 2013/0330268 A1    Dec. 12, 2013

(30) Foreign Application Priority Data
Feb. 18, 2011   (JP) .................................. 2011-033249

(51) Int. Cl.
*H01M 4/50* (2010.01)
*C01G 45/02* (2006.01)
(Continued)

(52) U.S. Cl.
CPC .................. *H01M 4/50* (2013.01); *C01G 45/02* (2013.01); *C01G 45/1221* (2013.01); *C25B 1/21* (2013.01);
(Continued)

(58) Field of Classification Search
CPC ... H01M 4/50; H01M 4/505; H01M 10/0525; C01G 45/1221; C01G 45/02; C25B 1/21; Y10T 428/2982; C01P 2006/11; C01P 2006/80; C01P 2006/12; C01P 2006/16; C01P 2006/14; C01P 2004/62; C01P 2004/61; C01P 2002/72; Y02E 60/122; Y02T 10/7011
USPC ......................................................... 423/605
See application file for complete search history.

(56) References Cited

U.S. PATENT DOCUMENTS 4,818,354 A    4/1989   Preisler et al.
6,190,800 B1 *  2/2001   Iltchev et al. ................. 429/224
(Continued)

FOREIGN PATENT DOCUMENTS

CN    1125784 A    7/1996
CN    1639890 A    7/2005
(Continued)

OTHER PUBLICATIONS

Deyang Qu, "Investigation of the porosity of electrolytic manganese dioxide and its performance as alkaline cathode material," Journal of Power Sources 156 (2006) 692-699.*
(Continued)

*Primary Examiner* — Anthony J Zimmer
(74) *Attorney, Agent, or Firm* — Sughrue Mion, PLLC

(57) ABSTRACT

The invention provides electrolytic a manganese dioxide with a BET specific surface area of 20 to 60 m²/g, and a volume of at least 0.023 cm³/g for pores with pore diameters of 2 to 200 nm. Also provided is a method for producing an electrolytic manganese dioxide including a step of suspending a manganese oxide in a sulfuric acid-manganese sulfate mixed solution to obtain the electrolytic manganese dioxide, wherein a manganese oxide particles are continuously mixed with a sulfuric acid-manganese sulfate mixed solution, for a manganese oxide particle concentration of 5 to 200 mg/L in the sulfuric acid-manganese sulfate mixed solution. Still further provided is a method for producing a lithium-manganese complex oxide, including a step of mixing the electrolytic manganese dioxide with a lithium compound and heat treating the mixture to obtain a lithium-manganese complex oxide.

13 Claims, 5 Drawing Sheets

(a)

(b)

(51) Int. Cl.
*H01M 4/505* (2010.01)
*H01M 10/0525* (2010.01)
*C25B 1/21* (2006.01)
*C01G 45/12* (2006.01)

(52) U.S. Cl.
CPC .......... *H01M 4/505* (2013.01); *H01M 10/0525* (2013.01); *C01P 2002/72* (2013.01); *C01P 2004/61* (2013.01); *C01P 2004/62* (2013.01); *C01P 2006/11* (2013.01); *C01P 2006/12* (2013.01); *C01P 2006/14* (2013.01); *C01P 2006/16* (2013.01); *C01P 2006/80* (2013.01); *Y02E 60/122* (2013.01); *Y02T 10/7011* (2013.01); *Y10T 428/2982* (2015.01)

(56) References Cited

U.S. PATENT DOCUMENTS

| | | | |
|---|---|---|---|
| 6,409,984 | B1 | 6/2002 | Hattori et al. |
| 6,863,876 | B2 * | 3/2005 | Davis et al. .................. 423/605 |
| 2001/0031239 | A1 | 10/2001 | Andersen et al. |
| 2003/0170170 | A1 | 9/2003 | Davis et al. |
| 2004/0151981 | A1 | 8/2004 | Spahr et al. |

FOREIGN PATENT DOCUMENTS

| | | | |
|---|---|---|---|
| CN | 101110476 A | | 1/2008 |
| EP | 0 751 241 A1 | | 1/1997 |
| JP | 51-3319 B | | 2/1976 |
| JP | 63-26389 A | | 2/1988 |
| JP | 3-158484 A | | 7/1991 |
| JP | 4-74720 A | | 3/1994 |
| JP | 6-150914 A | | 5/1994 |
| JP | 11-126607 A | | 5/1999 |
| JP | 2000-260430 A | | 9/2000 |
| JP | 2000260430 A | * | 9/2000 |
| JP | 2005-505904 A | | 2/2005 |
| JP | 2005-520290 A | | 7/2005 |
| JP | 2006-108084 A | | 4/2006 |
| WO | 03/032415 A2 | | 4/2003 |
| WO | 03/077330 A2 | | 9/2003 |

OTHER PUBLICATIONS

Chinese Office Action issued in application No. 201280009071.7 dated Mar. 11, 2015.
English Translation of International Preliminary Report on Patentability dated Aug. 29, 2013.
Preisler E., "Problems Involved in the Technical Preparation of Top Quality Electrolytic Manganese Dioxide", Progress in Batteries and Solar Cells, vol. 10, 1991, p. 1-p. 22, XP000329769.
European Search Report issued in counterpart application No. 12747635.6 dated Jul. 11, 2014.
M. M. Thackeray et al., "Spinel Electrodes from the Li-Mn-O System for Rechargeable Lithium Battery Applications", J. Electrochem. Soc., 1992, pp. 363-366, vol. 139, No. 2.
International Search Report of PCT/JP2012/053699 dated Mar. 27, 2012.

* cited by examiner (a)  (b)

US 9,214,675 B2

ELECTROLYTIC MANGANESE DIOXIDE AND METHOD FOR PRODUCING SAME, AND METHOD FOR PRODUCING LITHIUM-MANGANESE COMPLEX OXIDE

CROSS REFERENCE TO RELATED APPLICATIONS

This is a National Stage of International Application No. PCT/JP2012/053699 filed Feb. 16, 2012, claiming priority based on Japanese Patent Application No. 2011-033249 filed Feb. 18, 2011, the contents of all of which are incorporated herein by reference in their entirety.

TECHNICAL FIELD

The present invention relates to electrolytic manganese dioxide to be used as a starting material for a positive electrode active material for a lithium ion secondary battery, for example, and a method for producing it, and also to a method for producing a lithium-manganese complex oxide to be used in the positive electrode active material.

BACKGROUND ART

Lithium-manganese complex oxides, including lithium manganate composed mainly of manganese and having a spinel structure, are being studied as positive electrode active materials for lithium ion secondary batteries (hereunder referred to as "LIB") (see Non-Patent Literature 1, for example).

Lithium-manganese complex oxides not only have high rate capability and high safety, but they are also inexpensive. Therefore, lithium-manganese complex oxides are being studied for application not only in portable electronic devices but also for vehicles such as hybrid vehicles (HV) and electric vehicles (EV). However, LIB employing a lithium-manganese complex oxide as the positive electrode active material has low discharge capacity per volume, it's so called energy density, than LIB that has lithium cobaltate as the positive electrode active material. It is therefore desired to improve the energy density of lithium-manganese complex oxides.

Improving the energy density of a lithium-manganese complex oxide requires increase in its packing property. The packing property of a lithium-manganese complex oxide is significantly affected by the packing property of the manganese compound starting material. In order to obtain a lithium-manganese complex oxide with a high packing property, a manganese compound with a high packing property may be used as the manganese starting material.

Manganese compounds with high packing properties include electrolytic manganese dioxide and its heat-treated products, and these are therefore most widely used as manganese starting materials for lithium-manganese complex oxides (see Patent Literature 1, for example).

In order to further improve the packing property of electrolytic manganese dioxide, it has been proposed to use γ-type electrolytic manganese dioxide having a BET specific surface area of no greater than 35 m²/g, electrolytically synthesized in a manganese sulfate solution containing suspended manganese oxide, as the manganese starting material (Patent Literature 2).

For industrial production of such electrolytic manganese dioxide, electrolysis is performed using an electrolyte solution obtained from a starting material such as manganese ore or industrial water. To produce electrolytic manganese dioxide that has excellent reactivity with lithium compounds and the like, it is necessary to inhibit incorporation of impurities derived from these starting materials into the electrolytic manganese dioxide. Industrial methods for preventing inclusion of starting material-derived impurities have been reported, including a method wherein the starting material is a manganese compound obtained by extraction removal of the impurities from manganese ore (Patent Literature 3), and a method of using an electrolyte solution wherein the magnesium has been removed by adding a fluoride during the electrolyte solution treatment step (Patent Literature 4).

CITATION LIST

Patent Literature

[Patent Literature 1] Japanese Unexamined Patent Application Publication HEI No. 06-150914
[Patent Literature 2] Japanese Unexamined Patent Application Publication HEI No. 11-126607
[Patent Literature 3] Japanese Unexamined Patent Application Publication HEI No. 04-074720
[Patent Literature 4] Japanese Examined Patent Application Publication SHO No. 51-003319

Non-Patent Literature

[Non-Patent Literature 1] M. M. Thackeray et al., J. Electrochem. Soc., 139, 363 (1992)

SUMMARY OF INVENTION

Technical Problem

Electrolytic manganese dioxide has a higher packing property than chemically synthesized manganese dioxide. However, manganese starting materials for lithium-manganese complex oxides are in need of further improvement in packing density.

For example, the electrolytic manganese dioxide disclosed in Patent Literature 2 has an improved packing property due to a lower BET specific surface area. Nevertheless, in the method disclosed in Patent Literature 2, the reactivity between the obtained electrolytic manganese dioxide and lithium compounds is lower as the BET specific surface area decreases. In addition, the electrolytic manganese dioxide of Patent Literature 2 has also presented the problem that reduced BET specific surface area results in non-uniform reaction between the electrolytic manganese dioxide and lithium compounds.

It is an object of the present invention to provide electrolytic manganese dioxide suitable for production of a lithium-manganese complex oxide with high energy density, or in other words, electrolytic manganese dioxide that not only has a high packing property but also has excellent reactivity with lithium compounds. It is another object of the invention to provide a method for producing a lithium-manganese complex oxide employing it. It is yet another object of the invention to provide a method for producing electrolytic manganese dioxide that can inhibit inclusion of impurities such as alkaline earth metals without carrying out an additional impurity-treatment step at a stage prior to the electrolysis step or using highly toxic compounds such as fluorides, and that is suitable for being carried out on an industrial scale.

Solution to Problem

Specifically, the gist of the invention lies in the following aspects (1) to (15).

(1) Electrolytic manganese dioxide with a BET specific surface area of between 20 m²/g and 60 m²/g, and having a volume of at least 0.023 cm³/g for pores with pore diameters of between 2 nm and 200 nm.
(2) Electrolytic manganese dioxide according to (1) above, which has a volume of at least 0.025 cm³/g for pores with pore diameters of between 2 nm and 200 nm.
(3) Electrolytic manganese dioxide according to (1) or (2) above, which has a volume of at least 0.004 cm³/g for pores with pore diameters of between 2 nm and 50 nm.
(4) Electrolytic manganese dioxide according to any one of (1) to (3) above, which has a volume of at least 0.005 cm³/g for pores with pore diameters of between 2 nm and 50 nm.
(5) Electrolytic manganese dioxide according to any one of (1) to (4) above, wherein the apparent particle density is at least 3.4 g/cm³.
(6) Electrolytic manganese dioxide according to any one of (1) to (5) above, wherein the apparent particle density is at least 3.8 g/cm³.
(7) Electrolytic manganese dioxide according to any one of (1) to (6) above, wherein the bulk density is at least 1.5 g/cm³.
(8) Electrolytic manganese dioxide according to any one of (1) to (7) above, wherein the alkaline earth metal content is no greater than 500 ppm by weight.
(9) A method for producing electrolytic manganese dioxide comprising a step of suspending manganese oxide in a sulfuric acid-manganese sulfate mixed solution to obtain electrolytic manganese dioxide, in which step manganese oxide particles are continuously mixed with a sulfuric acid-manganese sulfate mixed solution, for a manganese oxide particle concentration of between 5 mg/L and 200 mg/L in the sulfuric acid-manganese sulfate mixed solution.
(10) The method for producing electrolytic manganese dioxide according to (9) above, wherein the sulfuric acid concentration in the sulfuric acid-manganese sulfate mixed solution is between 20 g/L and 30 g/L.
(11) The method for producing electrolytic manganese dioxide according to (9) or (10) above, wherein the electrolytic current density is between 0.8 A/dm² and 1.5 A/dm².
(12) The method for producing electrolytic manganese dioxide according to any one of (9) to (11) above, wherein the electrolytic current density is between 1.2 A/dm² and 1.4 A/dm².
(13) The method for producing electrolytic manganese dioxide according to any one of (9) to (12) above, wherein the mean particle size of the manganese oxide particles is no greater than 5 μm.
(14) The method for producing electrolytic manganese dioxide according to any one of (9) to (13) above, wherein the alkaline earth metal concentration of the sulfuric acid-manganese sulfate mixed solution is at least 0.5 g/L.
(15) A method for producing a lithium-manganese complex oxide, which comprises a step of mixing electrolytic manganese dioxide according to any one of (1) to (8) above with a lithium compound and heat treating the mixture to obtain a lithium-manganese complex oxide.

Advantageous Effects of Invention

The electrolytic manganese dioxide of the invention not only has a high packing property but also has excellent reactivity with lithium compounds. By using it as a manganese starting material for a lithium-manganese complex oxide, it is possible to obtain a lithium-manganese complex oxide having a high packing property and cell performance, particularly with high energy density.

Also, the method for producing electrolytic manganese dioxide according to the invention can provide electrolytic manganese dioxide that not only has a high packing property but also has excellent reactivity with lithium compounds. In addition, since the electrolytic manganese dioxide is stably electrodeposited during the electrolysis, the current efficiency is excellent.

Furthermore, even if the method for producing electrolytic manganese dioxide according to the invention employs an electrolyte solution with high impurities, and especially an electrolyte solution with a high alkaline earth metal content, it is possible to inhibit incorporation of alkaline earth metals into the obtained electrolytic manganese dioxide. This will not only eliminate the need for additional impurity removal at an early stage of electrolysis, but will also allow the use of electrolyte solutions with low purity, which have not been usable in the prior art.

DESCRIPTION OF EMBODIMENTS

Figure 1:
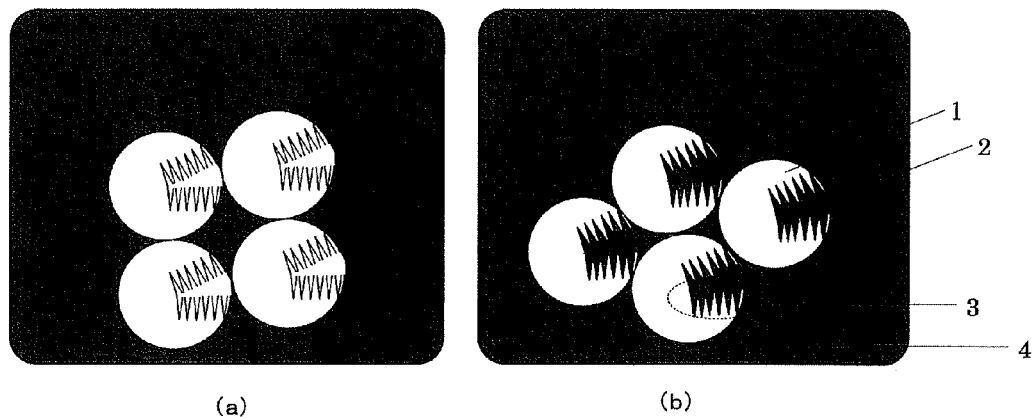
FIG. 1 is a schematic diagram illustrating the concepts of apparent particle density and bulk density for electrolytic manganese dioxide according to the invention.

Preferred embodiments of the electrolytic manganese dioxide of the invention will now be described in detail.

The electrolytic manganese dioxide of this embodiment has a BET specific surface area of between 20 m²/g and 60 m²/g. If the BET specific surface area is lower than 20 m²/g, the surface area actually contributing to the reaction will be too small. This will result in, for example, partial non-uniformity of reaction between the electrolytic manganese dioxide particles and lithium compound particles, and a non-homogeneous compositional ratio in the particles. The cell performance, and especially energy density, of the lithium-manganese complex oxide obtained thereby will thus be reduced. If the BET specific surface area is greater than 60 m²/g, the state of electrodeposition during electrolytic synthesis of electrolytic manganese dioxide will be inferior. Therefore, if the BET specific surface area is greater than 60 m²/g, it will be difficult to stably obtain electrolytic manganese dioxide. The BET specific surface area is between 20 m²/g and 60 m²/g, preferably between 25 m²/g and 55 m²/g, and more preferably between 36 m²/g and 50 m²/g.

The electrolytic manganese dioxide of this embodiment has a volume of at least 0.023 cm³/g, preferably at least 0.025 cm³/g, more preferably at least 0.03 cm³/g, even more preferably at least 0.035 cm³/g and yet more preferably at least 0.04 cm³/g, for pores with pore diameters of between 2 nm and 200 nm (hereunder referred to as "secondary pores").

The secondary pores are considered to contribute to reaction between the electrolytic manganese dioxide and lithium compound during lithium-manganese complex oxide synthesis. If the volume of secondary pores is within the aforementioned range, the electrolytic manganese dioxide will have high reactivity with lithium compounds.

Electrolytic manganese dioxide having a secondary pore volume of less than 0.023 cm$^3$/g either has reduced reactivity with lithium compounds, or produces non-uniform reaction with lithium compounds. The energy density of the obtained lithium-manganese complex oxide is lower as a result.

The reactivity with lithium compounds is improved with increasing secondary pore volume. However, their presence does not need to be greater than necessary. Thus, the secondary pore volume is, for example, preferably 0.1 cm$^3$/g at most, and more preferably 0.05 cm$^3$/g at most.

Among the secondary pores, the volume of pores with pore diameters between 2 nm and 50 nm (hereunder, "mesopores") is preferably at least 0.004 cm$^3$/g, more preferably at least 0.005 cm$^3$/g, even more preferably at least 0.01 cm$^3$/g and yet more preferably at least 0.015 cm$^3$/g.

Pores in the manganese starting material affect reaction between the manganese starting material and lithium compounds. Since the electrolytic manganese dioxide of this embodiment has mesopores within the aforementioned volume range, it tends to have even higher reactivity with lithium compounds. The upper limit for the volume of mesopores is not particularly restricted so long as the volume of mesopores is within the range specified above. The upper limit for the volume of mesopores may be 0.03 cm$^3$/g, for example.

If the volume of large pores with pore diameters exceeding 200 nm increases, the packing property of the electrolytic manganese dioxide will tend to be reduced. The electrolytic manganese dioxide of this embodiment promotes reaction with lithium compounds by the fine secondary pores, while it preferably has a low volume of large pores with pore diameters of greater than 200 nm. The volume of pores with pore diameters of greater than 200 nm in the electrolytic manganese dioxide of this embodiment is preferably no greater than 0.35 cm$^3$/g. The electrolytic manganese dioxide of this embodiment will thereby tend to have an even higher packing property.

The apparent particle density of the electrolytic manganese dioxide of this embodiment is preferably at least 3.4 g/cm$^3$, more preferably at least 3.7 g/cm$^3$, even more preferably at least 3.8 g/cm$^3$ and yet more preferably at least 3.9 g/cm$^3$. If the apparent particle density of the electrolytic manganese dioxide is at least 3.4 g/cm$^3$, the packing property of the lithium-manganese complex oxide obtained as a starting material will tend to be higher. Additionally, the electrolytic manganese dioxide of this embodiment will tend to have high reactivity with lithium compounds. As a result, the obtained lithium-manganese complex oxide can increase the energy density when used as a positive electrode active material for a lithium ion secondary battery.

The electrolytic manganese dioxide of this embodiment has a bulk density of preferably at least 1.5 g/cm$^3$, more preferably at least 1.7 g/cm$^3$ and even more preferably at least 1.8 g/cm$^3$. A high bulk density results in a high packing property, but it does not need to be higher than necessary. Therefore, the upper limit for the bulk density of the electrolytic manganese dioxide of this embodiment may be, for example, 3.0 g/cm$^3$ or even 2.5 g/cm$^3$.

The apparent particle density is the density calculated based on the actual volume of the electrolytic manganese dioxide particles. Such a volume will often include very fine cracks that cannot be filled with mercury even if high mercury pressure is used in mercury porosimetry. However, because such cracks are extremely fine, they have essentially no effect on the size of the volume. The apparent particle density calculated in this manner is highly correlated with reactivity between the electrolytic manganese dioxide and lithium compounds, and can serve as an index of the reactivity.

The bulk density, on the other hand, is the density determined by dividing the packing weight by the packing volume, and it is calculated from the virtual volume assumed to include electrolytic manganese dioxide filling cracks or fissures formed in the particles, in addition to the actual volume of electrolytic manganese dioxide particles. The bulk density is a density value that serves as an index of the packing property of the electrolytic manganese dioxide. However, because the bulk density has low correlation with reactivity between electrolytic manganese dioxide and lithium compounds, it is not a very good index for reactivity. That is, even with a high bulk density, a low apparent particle density tends to lower the reactivity of the electrolytic manganese dioxide with lithium compounds. In other words, a low apparent particle density of the electrolytic manganese dioxide can result in problems such as a non-uniform composition of the lithium-manganese complex oxide that is obtained as a result. This will tend to lower the cell performance of the lithium-manganese complex oxide obtained using the electrolytic manganese dioxide as a starting material.

FIG. 1 is a schematic diagram illustrating the concepts of apparent particle density and bulk density for electrolytic manganese dioxide according to this embodiment. FIG. 1(a) is a diagram showing particulate manganese dioxide, used as the basis to calculate the bulk density. Specifically, the bulk density is calculated based on virtual volume, assuming that electrolytic manganese dioxide fills the electrolytic manganese dioxide particles 1 as well as all of the pores 2, 3. FIG. 1(b) is a diagram showing the virtual volume of particulate electrolytic manganese dioxide, used as the basis to calculate the apparent particle density. Specifically, the apparent particle density is calculated based on the volume of the electrolytic manganese dioxide particles 1. The particles 1 may contain extremely fine pores, not shown in the drawing. Thus, both of these values differ from the volume used to calculate the density.

The secondary pore volume, mesopore volume, apparent particle density and bulk density can be measured by mercury porosimetry, for example. In mercury porosimetry, it is sometimes impossible to measure extremely fine pores among the pores 3 in FIG. 1 that have pore diameters of less than 200 nm, such as pores with pore diameters of less than 2 nm.

For the electrolytic manganese dioxide of this embodiment in an ordinary X-ray diffraction (XRD) analysis pattern using CuKα-rays as the light source, the full width at half maximum of the diffraction profile on the (110) plane where 2θ is near 22±1° (the full width at half maximum of this diffraction profile will hereunder be referred to simply as "FWHM") is preferably between 2.1° and 3.7°, and more preferably between 2.4° and 3.5°. If FWHM is at least 2.1°, the electrolytic manganese dioxide will have a crystallinity that facilitates reaction with lithium compounds. If FWHM is no greater than 3.7°, not only the reactivity but also the packing property of the electrolytic manganese dioxide will be high. A lithium-manganese complex oxide synthesized from this type of electrolytic manganese dioxide can easily serve as a positive electrode active material with high energy density.

The peak intensity ratio between the (110) plane and the (021) plane (hereunder referred to as "(110)/(021)") in the XRD analysis pattern of the electrolytic manganese dioxide of this embodiment is preferably between 0.5 and 0.90, and more preferably between 0.55 and 0.65.

The (110) plane peak and the (021) plane peak appear near 22±1° and 37±1°, respectively, in the X-ray diffraction for electrolytic manganese dioxide. These peaks are the major X-ray diffraction peaks for manganese dioxide crystals.

The crystal structure of the electrolytic manganese dioxide of this embodiment is not particularly restricted so long as it satisfies the BET specific surface area and pore structure (secondary pore volume) for this embodiment. The crystal structure of the electrolytic manganese dioxide of this embodiment may be any type of crystal structure selected from the group consisting of α-types, β-types and γ-types, but it is preferably a crystal structure including the γ-type, and more preferably a γ-type structure.

The potential of the electrolytic manganese dioxide of this embodiment, measured based on a mercury/mercury oxide reference electrode in a 40 wt % KOH aqueous solution (hereunder referred to as "alkaline potential") is no greater than 250 mV, more preferably no greater than 240 mV and even more preferably no greater than 235 mV. The electrolytic manganese dioxide will tend to be stable if the alkaline potential is no greater than 250 mV. Specifically, the electrochemical properties will be resistant to change even when the electrolytic manganese dioxide is stored for prolonged periods. Also, electrolytic synthesis of electrolytic manganese dioxide with an alkaline potential of no greater than 250 mV tends to avoid corrosion of the electrode material.

The electrolytic manganese dioxide of this embodiment preferably has an alkaline earth metal content of no greater than 500 ppm by weight (0.05 wt %). A low alkaline earth metal content helps promote reaction between the electrolytic manganese dioxide and lithium compounds. Although a lower alkaline earth metal content is preferred, the alkaline earth metal content in industrially produced electrolytic manganese dioxide may be 100 ppm by weight or greater.

The alkaline earth metal calcium (Ca) has a major inhibiting effect on reaction between electrolytic manganese dioxide and lithium compounds. Therefore, the calcium content in the electrolytic manganese dioxide is preferably no greater than 250 ppm by weight and more preferably no greater than 200 ppm by weight. Although a lower calcium content is preferred, the calcium content in industrially produced electrolytic manganese dioxide may be 50 ppm by weight or greater.

The electrolytic manganese dioxide of this embodiment is manganese dioxide obtained by electrolysis, with no particular limitation on its form. For example, it may be obtained as an aggregate precipitated on the electrode, or in powder form obtained by crushing the aggregate. The electrolytic manganese dioxide of this embodiment may also include trace components other than manganese dioxide as impurities, so long as it is composed mainly of manganese dioxide.

A method for producing electrolytic manganese dioxide according to this embodiment will now be described.

The electrolytic manganese dioxide of this embodiment can be produced by a method for producing electrolytic manganese dioxide that includes a step of suspending manganese oxide in a sulfuric acid-manganese sulfate mixed solution to obtain electrolytic manganese dioxide, in which step manganese oxide particles are continuously mixed with a sulfuric acid-manganese sulfate mixed solution, and electrolysis is performed with a manganese oxide particle concentration of between 5 mg/L and 200 mg/L in the sulfuric acid-manganese sulfate mixed solution.

A preferred embodiment of the method for producing electrolytic manganese dioxide according to the invention will now be described in detail. The production method of this embodiment is a "suspension electrolysis method", i.e. a method for producing electrolytic manganese dioxide in which manganese oxide is suspended in an electrolyte solution. It therefore differs from "non-slurry electrolysis", which is production of electrolytic manganese dioxide by electrolysis of a sulfuric acid-manganese sulfate mixed solution, without using manganese oxide. Only when using a suspension electrolysis method, it has become possible to produce electrolytic manganese dioxide according to this embodiment, having a controlled pore structure (secondary pore volume) and BET specific surface area. In addition, with a suspension electrolysis method the electrolytic current efficiency is improved compared to non-slurry electrolysis, which does not use manganese oxide. Furthermore, it can inhibit incorporation of impurities, and especially alkaline earth metals, from the electrolyte solution into the electrolytic manganese dioxide, which has not been possible with non-slurry electrolysis.

In the production method of this embodiment, a sulfuric acid-manganese sulfate mixed solution is used as the electrolyte solution. Unlike electrolysis methods which use manganese sulfate aqueous solutions as electrolyte solutions, methods that use sulfuric acid-manganese sulfate mixed solutions as electrolyte solutions maintain a constant sulfuric acid concentration during the electrolysis period. This produces a constant sulfuric acid concentration even during prolonged electrolysis, so that not only the electrolytic manganese dioxide production can be stabilized, but the state of the pores of the obtained electrolytic manganese dioxide is also uniform.

In the production method of this embodiment, it is possible to inhibit incorporation of impurities, and especially alkaline earth metals, from the electrolyte solution into the electrolytic manganese dioxide. In the production method of this embodiment, therefore, not only is there no need for special treatment of manganese ore, but it is also possible to reduce the burden of removing impurities during the electrolyte solution preparation step. Thus, the sulfuric acid-manganese sulfate mixed solution of this embodiment may be one containing essentially no alkaline earth metal (an alkaline earth metal concentration of 0 g/L to 0.1 g/L). However, the alkaline earth metal concentration of the sulfuric acid-manganese sulfate aqueous solution may be 0.5 g/L or greater, 1.0 g/L or greater, or even 1.5 g/L or greater. Even when a sulfuric acid-manganese sulfate mixed solution having such a high alkaline earth metal concentration is used, the alkaline earth metal content in the electrolytic manganese dioxide obtained by the production method of this embodiment will be no greater than 500 ppm by weight or even no greater than 450 ppm by weight, which is an industrially problem-free alkaline earth metal content.

If the alkaline earth metal content of the sulfuric acid-manganese sulfate mixed solution increases, incorporation of alkaline earth metals into the electrolytic manganese dioxide will tend to increase. In the production method of this embodiment, however, the alkaline earth metal concentration of the obtained electrolytic manganese dioxide will tend to be of an industrially problem-free level, even when electrolysis has been carried out with a sulfuric acid-manganese sulfate mixed solution with an alkaline earth metal content of no greater than 5.0 g/L or even no greater than 3.0 g/L.

The calcium (Ca) in the alkaline earth metal has a low saturated concentration of no greater than 1 g/L, and tends to precipitate in the sulfuric acid-manganese sulfate mixed solution. Therefore, calcium is especially easily incorporated into electrolytic manganese dioxide, and the calcium incorporated into the electrolytic manganese dioxide inhibits reaction between the electrolytic manganese dioxide and lithium compounds. In the production process of this embodiment, however, incorporation of calcium into electrolytic manganese dioxide is suppressed. Therefore, the calcium concentration in the sulfuric acid-manganese sulfate mixed solution for the production method of this embodiment may be 0.3 g/L or greater, 0.5 g/L or greater, or even 0.8 g/L or greater.

In the production method of this embodiment, manganese oxide is continuously mixed into the sulfuric acid-manganese sulfate mixed solution. This can stabilize the manganese oxide concentration during the electrolysis period, improving the physical properties, and especially the pore homogeneity, of the electrolytic manganese dioxide obtained throughout the entire electrolysis period.

The method of continuously mixing manganese oxide in the sulfuric acid-manganese sulfate mixed solution may be a method in which the manganese oxide particles are mixed into the sulfuric acid-manganese sulfate mixed solution, or a method in which an oxidizing agent is mixed with the electrolyte solution to form manganese oxide particles in the sulfuric acid-manganese sulfate mixed solution, or both of these methods in combination.

The concept of "continuous mixing" in the production method of this embodiment includes not only mixing manganese oxide into the sulfuric acid-manganese sulfate mixed solution to a fixed proportion throughout the entire electrolysis period, but also intermittently mixing manganese oxide into the sulfuric acid-manganese sulfate mixed solution in such a manner that the manganese oxide concentration in the sulfuric acid-manganese sulfate mixed solution is constant throughout the entire electrolysis period (for example, so that the manganese oxide concentration in the sulfuric acid-manganese sulfate mixed solution is ±20% the target value).

When manganese oxide particles are to be mixed into the sulfuric acid-manganese sulfate mixed solution, the manganese oxide particles to be mixed may be, for example, particles containing at least one type of compound selected from the group consisting of manganese dioxide ($MnO_2$), dimanganese trioxide ($Mn_2O_3$) and trimanganese tetraoxide ($Mn_3O_4$). Manganese dioxide particles are most preferably used, among these. Such manganese oxide particles may be mixed with the sulfuric acid-manganese sulfate mixed solution after first being prepared as a slurry, or the manganese oxide particles may be mixed directly into the sulfuric acid-manganese sulfate mixed solution.

When an oxidizing agent is mixed to form manganese oxide particles, there are no particular restrictions on the type of oxidizing agent so long as manganese ion is deposited as manganese oxide particles in the sulfuric acid-manganese sulfate mixed solution. Persulfuric acid salts may be mentioned as examples of oxidizing agents, with sodium persulfate ($Na_2S_2O_8$) being a preferred example.

The mean particle size of the manganese oxide particles is preferably no greater than 5 μm, more preferably no greater than 3 μm, even more preferably no greater than 1 μm and yet more preferably no greater than 0.9 μm. If the mean particle size is no greater than 5 μm, settling of the manganese oxide particles will be prevented and more even dispersion will tend to take place in the sulfuric acid-manganese sulfate mixed solution. Thus, the manganese oxide particles preferably have a mean particle size such that the dispersibility is not reduced, but a realistic lower limit is 0.5 μm or greater. The "mean particle size" referred to herein is the volume-based 50% diameter ($d_{50}$), and it can be measured by the MICROTRAC method, for example.

The manganese oxide particle concentration in the sulfuric acid-manganese sulfate mixed solution is between 5 mg/L and 200 mg/L. If the manganese oxide particle concentration exceeds 200 mg/L, the BET specific surface area of the obtained electrolytic manganese dioxide will be too low. From the viewpoint of obtaining electrolytic manganese dioxide having not only a high packing property but also a high BET specific surface area, the manganese oxide particle concentration is preferably no greater than 150 mg/L, more preferably no greater than 100 mg/L, even more preferably no greater than 50 mg/L and yet more preferably no greater than 40 mg/L. This will inhibit incorporation of alkaline earth metals from the sulfuric acid-manganese sulfate mixed solution into the electrolytic manganese dioxide. If the manganese oxide particle concentration is less than 5 mg/L, however, no effect will be obtained by adding the manganese oxide. In order to increase the effect of mixing the manganese oxide particles, the manganese oxide particle concentration is preferably at least 8 mg/L, more preferably at least 10 mg/L, even more preferably at least 15 mg/L and yet more preferably at least 20 mg/L.

An aqueous manganese sulfate solution is fed into the sulfuric acid-manganese sulfate mixed solution during the electrolytic synthesis. The manganese ion concentration in the aqueous manganese sulfate solution used for feeding is, for example, between 30 g/L and 110 g/L, and preferably between 30 g/L and 60 g/L.

The sulfuric acid-manganese sulfate mixed solution has a sulfuric acid concentration of preferably between 18 g/L and 50 g/L, more preferably between 20 g/L and 40 g/L, and even more preferably between 20 g/L and 30 g/L. The "sulfuric acid concentration" referred to here is the value minus the divalent anion of the manganese sulfate.

In the production method of this embodiment, the electrolytic current density is preferably between 0.8 $A/dm^2$ and 1.5 $A/dm^2$. If the electrolytic current density is no greater than 1.5 $A/dm^2$, it will be possible to inhibit increase in the electrolytic voltage during electrolytic synthesis. This will facilitate efficient and stable production of the electrolytic manganese dioxide of this embodiment. In order to obtain the electrolytic manganese dioxide of this embodiment in a more stable manner, the electrolytic current density is more preferably between 1.0 $A/dm^2$ and 1.5 $A/dm^2$, and even more preferably between 1.2 $A/dm^2$ and 1.4 $A/dm^2$.

If the manganese oxide concentration in the sulfuric acid-manganese sulfate mixed solution is at least 200 mg/L, it will be possible to inhibit increase in the electrolytic voltage even if the electrolytic current density is high. However, a manganese oxide particle concentration of greater than 200 mg/L will excessively lower the BET specific surface area of the obtained electrolytic manganese dioxide. As a result, it will not be possible to obtain electrolytic manganese dioxide according to this embodiment.

The electrolysis temperature may be between 90° C. and 98° C., for example. Since a higher electrolysis temperature increases production efficiency for electrolytic manganese dioxide, the electrolysis temperature preferably exceeds at least 95° C.

By mixing the electrolytic manganese dioxide of this embodiment with a lithium compound and heat treating it, it is possible to obtain a homogeneous lithium-manganese complex oxide with a high packing property.

When the electrolytic manganese dioxide of this embodiment is to be used as a manganese starting material for a lithium-manganese complex oxide, the production may be carried out by a common method. The electrolytic manganese dioxide of this embodiment may also be crushed if necessary, to the desired particle size.

Any type of lithium compound may be used, examples of which include lithium hydroxide, lithium oxide, lithium carbonate, lithium iodide, lithium nitrate, lithium oxalate and alkyllithium compounds. Examples of preferred lithium compounds are lithium hydroxide, lithium oxide and lithium carbonate.

Preferred embodiments of the invention were described above, but the invention is in no way limited to these embodiments.

EXAMPLES

The present invention will now be explained in greater detail by examples and comparative examples, with the understanding that the invention is in no way limited only to the examples. The methods for measuring and evaluating the physical properties of electrolytic manganese dioxide will be explained first.

(Measurement of Pore Volume and Apparent Particle Density of Electrolytic Manganese Dioxide)

The secondary pore and mesopore pore volumes, apparent particle density and bulk density of the electrolytic manganese dioxide were measured by mercury porosimetry using a commercially available apparatus (trade name: Poresizer 9510, by Micromeritics, Japan).

Before measurement by mercury porosimetry, the electrolytic manganese dioxide to be measured was subjected to ventilation drying at 80° C., as pretreatment. Measurement was then conducted while varying the mercury pressure range in a stepwise manner from atmospheric pressure to 414 MPa, to determine the pore distribution (volume distribution). Pores with pore diameters between 2 nm and 200 nm were designated as "secondary pores", while pores with pore diameters between 2 nm and 50 nm were designated as "mesopores". In these examples, the pore distribution in the range of less than 2 nm cannot be measured because mercury does not fill the pores with pore diameters of less than 2 nm even with increased mercury pressure.

The bulk density of electrolytic manganese dioxide was determined from the amount of mercury with mercury introduced at atmospheric pressure, and the apparent particle density was determined from the amount of mercury with mercury introduced to a high pressure of 414 MPa. FIG. 1 is a schematic diagram illustrating the concepts of apparent particle density and bulk density of particulate electrolytic manganese dioxide.

As shown in FIG. 1, since mercury is introduced at atmospheric pressure during measurement of the bulk density, the mercury 4 does not fill in the pores (200 nm or greater) 2 and pores (less than 200 nm) 3 in the electrolytic manganese dioxide 1. On the other hand, since mercury is introduced at high pressure during measurement of the apparent particle density, the mercury 4 does fill in the pores (200 nm or greater) 2 and pores (less than 200 nm) 3 in the electrolytic manganese dioxide. However, at the pressure during measurement of the apparent particle density, the mercury 4 does not fill in the extremely fine pores (less than 2 nm) among the pores (less than 200 nm) 3 in the electrolytic manganese dioxide.

(Measurement of BET Specific Surface Area)

The BET specific surface area of the electrolytic manganese dioxide was measured by nitrogen adsorption in the single point BET method. The measuring apparatus used was a gas adsorption-type specific surface area measuring apparatus (trade name: Flowsorb III, by Shimadzu Corp.). Prior to measurement, the measuring sample was subjected to deaerating treatment by heating at 150° C. for 40 minutes.

(Measurement of Full Width at Half Maximum (FWHM) in XRD)

The FWHM in the diffraction profile for the electrolytic manganese dioxide where 2θ was near 22±1° was measured using a common X-ray diffraction apparatus (trade name: MXP-3, by Mac Science). CuKα-rays (λ=1.5405 angstrom) were used as the radiation source, the measuring mode was step scan, and the scan conditions were 0.04° per second, a measuring time of 3 seconds, and a measurement range from 5° to 80° as 2θ.

(Calculation of (110)/(021))

In an XRD graph obtained in the same manner as the FWHM, the diffraction profile where 2θ was near 22±1° was recorded as the peak corresponding to the (110) plane, and the diffraction profile near 37±1° was recorded as the peak corresponding to the (021) plane. The peak intensity on the (110) plane was divided by the peak intensity on the (021) plane, to calculate (110)/(021).

(Measurement of Alkaline Potential of Electrolytic Manganese Dioxide)

The alkaline potential of the electrolytic manganese dioxide was measured in the following manner in an aqueous 40% KOH solution.

To 3 g of electrolytic manganese dioxide there was added 0.9 g of carbon as a conductive agent, to prepare a mixed powder. To the mixed powder there was added 4 ml of aqueous 40% KOH, and these were mixed to obtain a mixed slurry containing electrolytic manganese dioxide, carbon and aqueous KOH. The potential of the mixed slurry was measured based on a mercury/mercury oxide reference electrode, and the alkaline potential of the electrolytic manganese dioxide was calculated.

(Measurement of Mean Particle Size of Manganese Oxide Particles)

After pouring 0.5 g of electrolytic manganese dioxide into 50 mL of purified water, ultrasonic irradiation was performed for 10 seconds to prepare a dispersion slurry. A prescribed amount of the dispersion slurry was poured into a measuring apparatus (trade name: MICROTRAC HRA, by Honeywell), and the particle size distribution was measured by laser diffraction. The particle size distribution and mean particle size of the manganese oxide particles was calculated from the obtained particle size distribution data. Upon measurement, the refractive index of the purified water was found to be 1.33, and the refractive index of the manganese dioxide was 2.20.

Example 1

A sulfuric acid-manganese sulfate mixed solution was used as the electrolyte solution. The electrolyte solution was poured into an electrolytic bath, and electrolysis was carried out while continuously adding a feeding manganese sulfate solution with a manganese ion concentration of 40.0 g/L and an aqueous sodium persulfate solution containing 200 g/L of sodium persulfate into the electrolytic bath, electrodepositing electrolytic manganese dioxide on the electrode. During the electrolysis, the electrolytic current density was 1.2 A/dm$^2$ and the electrolysis temperature was 96° C. The feeding manganese sulfate solution was added for a sulfuric acid concentration of 25.0 g/L in the electrolytic bath, and electrolysis was continued for 8 days. Also, the sodium persulfate aqueous solution was continuously added for a manganese oxide particle concentration of 5 mg/L in the electrolyte solution. The electrolytic voltage upon completion of electrolysis in Example 1 was 3.35 V.

Figure 3:
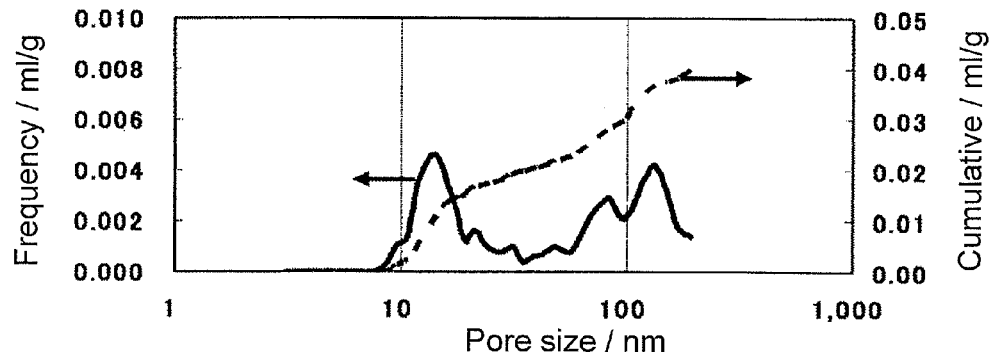
FIG. 3 is a graph showing pore size distribution for Example 1.

The electrolytic manganese dioxide production conditions in Example 1 are shown in Table 1, the evaluation results of the obtained electrolytic manganese dioxide are shown in Table 2, and the pore size distribution is shown in FIG. 3. The volume of pores of greater than 200 nm in the obtained electrolytic manganese dioxide was 0.26 cm$^3$/g.

Figure 2:
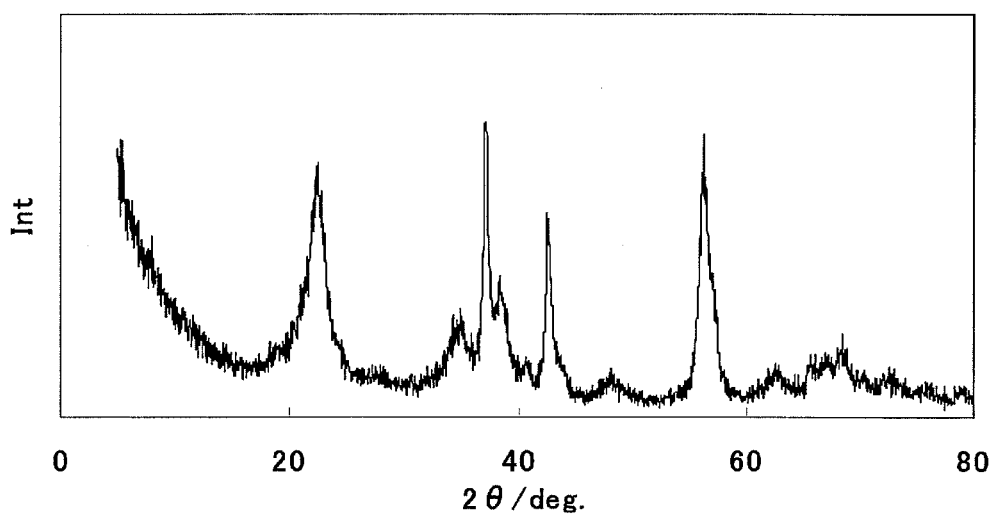
FIG. 2 is an XRD graph for the manganese oxide used in Example 1.

Addition of the aqueous sodium persulfate solution during the electrolysis produced particles of manganese oxide with a mean particle size of 1 to 3 µm in the sulfuric acid-manganese sulfate mixed solution. The obtained particles were recovered, and the crystal phase and composition were analyzed. A powder X-ray diffraction graph for the obtained particles is shown in FIG. 2. The manganese oxide was confirmed to be crystalline manganese oxide ($MnO_{1.96}$) with a distinct diffraction peak.

Example 2

Electrolytic manganese dioxide was produced under the same conditions as Example 1, except that the aqueous sodium persulfate solution was continuously added to the electrolytic bath for a manganese oxide particle concentration of 15 mg/L in the electrolyte solution. The electrolytic voltage upon completion of electrolysis in Example 2 was 3.35 V.

The electrolytic manganese dioxide production conditions in Example 2 are shown in Table 1, and the evaluation results of the obtained electrolytic manganese dioxide are shown in Table 2. In the obtained electrolytic manganese dioxide, the volume of pores with pore diameters of greater than 200 nm was 0.23 $cm^3/g$.

Example 3

Figure 4:
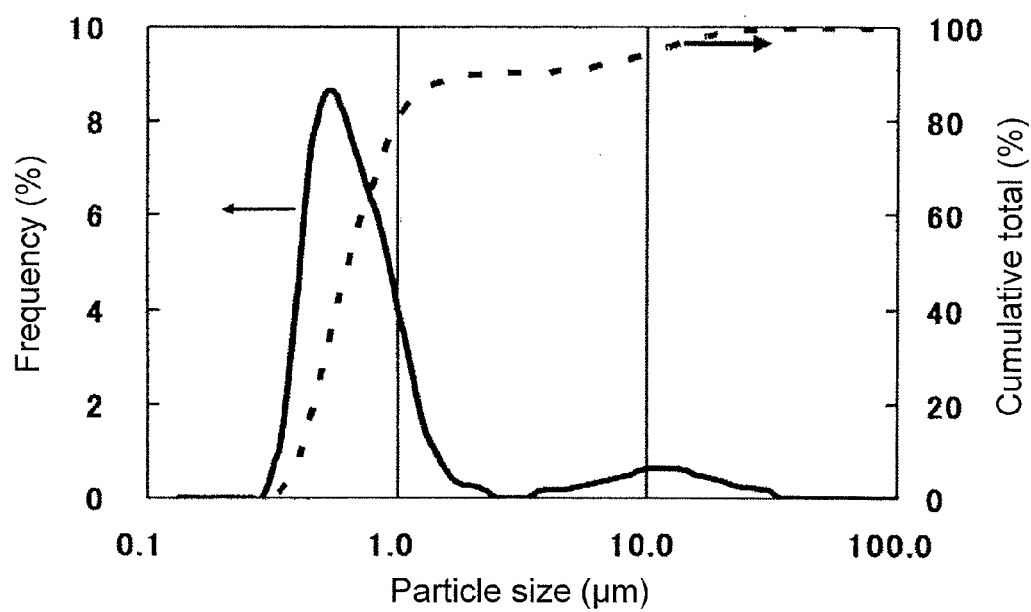
FIG. 4 is a graph showing particle size distribution for the manganese oxide used in Example 3.

Commercially available electrolytic manganese dioxide (trade name: HH-S, by Tosoh Corp.) was crushed with a jet mill, to obtain electrolytic manganese dioxide particles with a mean particle size (volume-average particle size) of 0.63 µm. This was used as manganese oxide particles. The particle size distribution of the manganese oxide particles is shown in FIG. 4. The manganese oxide particles were dispersed in water to a concentration of 30 g/L to prepare a slurry. The slurry was continuously added to the electrolyte solution for a manganese oxide particle concentration of 60 mg/L in the sulfuric acid-manganese sulfate mixed solution.

Electrolytic manganese dioxide was produced in the same manner as Example 1, except that these manganese oxide particles were added instead of an aqueous sodium persulfate solution, the electrolytic current density was 1.37 $A/dm^2$ during electrolysis, and the electrolysis was carried out for 7 days.

The electrolytic manganese dioxide production conditions in Example 3 are shown in Table 1, and the evaluation results of the obtained electrolytic manganese dioxide are shown in Table 2. The electrolytic voltage upon completion of electrolysis in Example 3 was 3.05 V.

The manganese oxide particles used in Example 3 had a content of 93 wt % of particles with sizes of no greater than 1 µm, an iron content of 45 ppm and a Mn valency of 3.92.

Example 4

Electrolytic manganese dioxide was produced under the same conditions as Example 3, except that the electrolytic current density during electrolysis was 1.5 $A/dm^2$, and the electrolysis was carried out for 6 days.

The electrolytic manganese dioxide production conditions in Example 4 are shown in Table 1, and the evaluation results of the obtained electrolytic manganese dioxide are shown in Table 2. The electrolytic voltage upon completion of electrolysis was 3.48 V.

Example 5

Electrolytic manganese dioxide was produced under the same conditions as Example 3, except that the electrolytic current density during electrolysis was 1.5 $A/dm^2$, the electrolysis was carried out for 4 days, and the manganese oxide particles were added to the sulfuric acid-manganese sulfate mixed solution for a manganese oxide particle concentration of 30 mg/L in the sulfuric acid-manganese sulfate mixed solution.

The electrolytic manganese dioxide production conditions in Example 5 are shown in Table 1, and the evaluation results of the obtained electrolytic manganese dioxide are shown in Table 2. The electrolytic voltage upon completion of electrolysis was 3.59 V.

Example 6

A sulfuric acid-manganese sulfate mixed solution was used as the electrolyte solution. Electrolysis was then carried out while continuously adding a feeding manganese sulfate solution with a manganese ion concentration of 43 g/L, and a slurry prepared by dispersing electrolytic manganese dioxide particles obtained by the same method as Example 3 in water to a concentration of 30 g/L, for production of electrolytic manganese dioxide.

The slurry was added to a manganese oxide particle concentration of 45 mg/L in the sulfuric acid-manganese sulfate mixed solution. Also, the feeding manganese sulfate solution was added to the electrolyte solution for a sulfuric acid concentration of 25.0 g/L in the sulfuric acid-manganese sulfate liquid mixture. The electrolytic current density during electrolysis was 1.39 $A/dm^2$, and the electrolysis temperature was 96° C. The electrolysis was carried out for 7 days. The electrolytic voltage upon completion of electrolysis in Example 6 was 2.77 V.

The electrolytic manganese dioxide production conditions in Example 6 are shown in Table 1, and the evaluation results of the obtained electrolytic manganese dioxide are shown in Table 2.

Example 7

An aqueous manganese sulfate solution and an aqueous sodium hydroxide (NaOH) solution were mixed while injecting air, to obtain a precipitate. The obtained precipitate was filtered, rinsed and dried, and subsequently crushed, to obtain manganese oxide particles with a mean particle size of 0.61 µm. The obtained manganese oxide particles were trimanganese tetraoxide particles comprising a single phase of trimanganese tetraoxide.

Electrolytic manganese dioxide was obtained under the same production conditions as Example 1, except that trimanganese tetraoxide particles were used instead of electrolytic manganese dioxide particles, a feeding manganese sulfate solution with a manganese ion concentration of 42 g/L was used, the electrolytic current density during electrolysis was 1.5 $A/dm^2$, the electrolysis was conducted for 25 hours, and the slurry was added to a manganese oxide particle concentration of 25 mg/L in the sulfuric acid-manganese sulfate mixed solution.

The electrolytic manganese dioxide production conditions in Example 7 are shown in Table 1, and the evaluation results of the obtained electrolytic manganese dioxide are shown in Table 2.

Example 8

Electrolytic manganese dioxide (trade name: HH-S, by Tosoh Corp.) was fired at 620° C. for 12 hours, to obtain manganese oxide particles with a mean particle size of 0.96

μm. The obtained manganese oxide particles were dimanganese trioxide particles comprising a single phase of dimanganese trioxide ($Mn_2O_3$).

Electrolytic manganese dioxide was obtained under the same conditions as Example 7, except that the dimanganese trioxide particles were used instead of electrolytic manganese dioxide particles.

The electrolytic manganese dioxide production conditions in Example 8 are shown in Table 1, and the evaluation results of the obtained electrolytic manganese dioxide are shown in Table 2.

Comparative Example 2

Electrolytic manganese dioxide was produced in the same manner as Comparative Example 1, except that during electrolysis the electrolytic current density was 0.6 A/dm$^2$ and the electrolytic temperature was 96° C., the sulfuric acid concentration in the electrolytic bath was 35.0 g/L, the manganese oxide particle concentration in the sulfuric acid-manganese sulfate mixed solution was adjusted to 2 mg/L, and the electrolysis was carried out for 15 days. The electrolytic voltage upon completion of electrolysis was 2.8 V.

TABLE 1

| | Electrolysis conditions | | | | | |
|---|---|---|---|---|---|---|
| | Manganese ion concentration of replenishing manganese sulfate solution (g/L) | Sulfuric acid concentration of sulfuric acid-manganese sulfate mixed solution (g/L) | Electrolytic current density (A/dm$^2$) | Electrolysis period | Manganese oxide particle concentration (mg/L) | Electrolytic voltage at completion of electrolysis (V) |
| Example 1 | 40 | 25.0 | 1.2 | 8 days | 5 | 3.35 |
| Example 2 | 40 | 25.0 | 1.2 | 8 days | 15 | 3.35 |
| Example 3 | 40 | 25.0 | 1.37 | 7 days | 60 | 3.05 |
| Example 4 | 40 | 25.0 | 1.5 | 6 days | 60 | 3.48 |
| Example 5 | 40 | 25.0 | 1.5 | 4 days | 30 | 3.59 |
| Example 6 | 43 | 25.0 | 1.39 | 7 days | 45 | 2.77 |
| Example 7 | 42 | 25.0 | 1.5 | 25 hrs | 25 | 2.25 |
| Example 8 | 42 | 25.0 | 1.5 | 25 hrs | 25 | 2.29 |

TABLE 2

| | Electrolytic manganese dioxide | | | | | | | |
|---|---|---|---|---|---|---|---|---|
| | 2-200 nm pore volume (cm$^3$/g) | 2-50 nm pore volume (cm$^3$/g) | BET specific surface area (m$^2$/g) | Bulk density (g/cm$^3$) | Apparent particle density (g/cm$^3$) | FWHM (deg.) | (110)/(021) (-) | Alkaline potential (mV) |
| Example 1 | 0.040 | 0.022 | 47.4 | 1.8 | 3.8 | 3.47 | 0.57 | 220 |
| Example 2 | 0.038 | 0.018 | 40.3 | 1.9 | 3.9 | 3.32 | 0.54 | 230 |
| Example 3 | 0.033 | 0.006 | 25.3 | 2.0 | 3.4 | 2.61 | 0.72 | 240 |
| Example 4 | 0.039 | 0.014 | 33.4 | 2.0 | 3.6 | 2.95 | 0.61 | 247 |
| Example 5 | 0.041 | 0.026 | 48.1 | 1.7 | 3.5 | 3.46 | 0.58 | 235 |
| Example 6 | 0.023 | 0.010 | 32 | 2.1 | 3.6 | 2.41 | 0.80 | 207 |
| Example 7 | 0.025 | 0.004 | 26 | 2.1 | 3.8 | 2.93 | — | 222 |
| Example 8 | 0.026 | 0.009 | 30 | 2.2 | 3.9 | 2.86 | — | 229 |

Comparative Example 1

A sulfuric acid-manganese sulfate solution was used as an electrolyte solution in the same manner as Example 1. Electrolysis was carried out for 12 days while continuously adding a feeding manganese sulfate solution with a manganese ion concentration of 40.0 g/L into the electrolytic bath, to produce electrolytic manganese dioxide. The electrolytic current density during the electrolysis was 0.8 A/dm$^2$, and the electrolysis temperature was 92° C. The sulfuric acid concentration in the electrolytic bath during electrolysis was 25.0 g/L, and the manganese oxide particle concentration in the sulfuric acid-manganese sulfate mixed solution was adjusted to 3 mg/L. The electrolytic voltage upon completion of electrolysis was 3.2 V.

Figure 5:
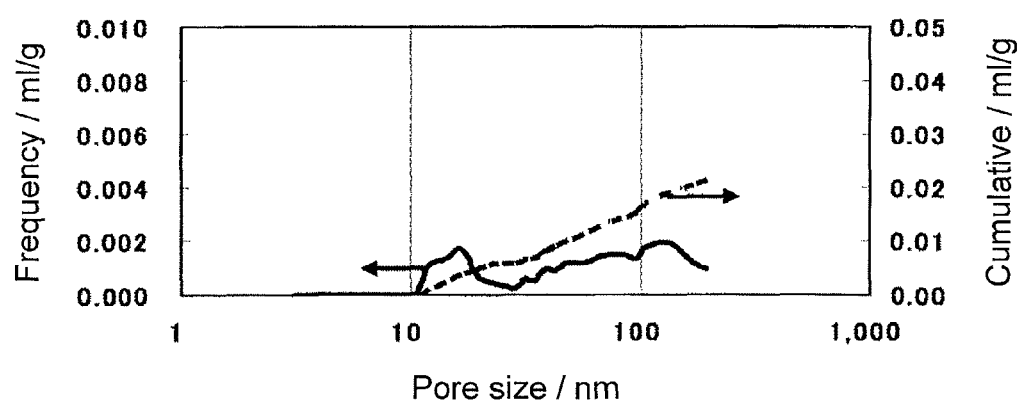
FIG. 5 is a graph showing pore size distribution for Comparative Example 1.

The electrolytic manganese dioxide production conditions for Comparative Example 1 are shown in Table 3, the evaluation results for the obtained electrolytic manganese dioxide are shown in Table 4, and the pore size distribution of the electrolytic manganese dioxide is shown in FIG. 5.

The electrolytic manganese dioxide production conditions in Comparative Example 2 are shown in Table 3, and the evaluation results of the obtained electrolytic manganese dioxide are shown in Table 4.

Comparative Example 3

Electrolysis was carried out in the same manner as Comparative Example 1, except that during electrolysis the electrolytic current density was 1.2 A/dm$^2$ and the electrolytic temperature was 96° C. The electrolytic voltage increased abruptly immediately after turning on electricity, and after 2 hours the electrolytic voltage exceeded 4.0 V. The electrolysis was therefore terminated 2 hours after turning on electricity. Because of the small electrodeposition thickness of the compound electrodeposited on the electrode, it was not possible to detach the electrodeposited electrolytic manganese dioxide from the electrode, and electrolytic manganese dioxide could not be obtained.

The electrolytic manganese dioxide production conditions in Comparative Example 3 are shown in Table 3.

Comparative Example 4

Electrolytic manganese dioxide was produced in the same manner as Comparative Example 1, except that during electrolysis, the electrolytic current density was 0.2 A/dm$^2$ and the electrolytic temperature was 96° C., and the electrolysis was conducted for 30 days. The electrolytic voltage upon completion of electrolysis was 2.3 V.

The electrolytic manganese dioxide production conditions in Comparative Example 4 are shown in Table 3, and the evaluation results of the obtained electrolytic manganese dioxide are shown in Table 4.

TABLE 3

| | Electrolysis conditions | | | | | |
|---|---|---|---|---|---|---|
| | Manganese ion concentration of replenishing manganese sulfate solution (g/L) | Sulfuric acid concentration of sulfuric acid-manganese sulfate mixed solution g/L | Electrolytic current density (A/dm$^2$) | Electrolysis period (days) | Manganese oxide particle concentration (mg/L) | Electrolytic voltage at completion of electrolysis (V) |
| Comp. Ex. 1 | 40 | 25.0 | 0.8 | 12 | 3 | 3.2 |
| Comp. Ex. 2 | 40 | 35.0 | 0.6 | 15 | 2 | 2.8 |
| Comp. Ex. 3 | 40 | 25.0 | 1.2 | — | —*[1] | — |
| Comp. Ex. 4 | 40 | 25.0 | 0.2 | 30 | —*[1] | 2.3 |

*[1] —indicates an unmeasurable value.

TABLE 4

| | Electrolytic manganese dioxide | | | | | | | |
|---|---|---|---|---|---|---|---|---|
| | 2-200 nm pore volume (cm$^3$/g) | 2-50 nm pore volume (cm$^3$/g) | BET specific surface area (m$^2$/g) | Bulk density (g/cm$^3$) | Apparent particle density (g/cm$^3$) | FWHM (deg.) | (110)/(021) (—) | Alkaline potential (mV) |
| Comp. Ex. 1 | 0.021 | 0.010 | 50 | 1.9 | 3.6 | 3.50 | 0.39 | 230 |
| Comp. Ex. 2 | 0.016 | 0.006 | 38 | 1.9 | 3.5 | 2.95 | 0.56 | 275 |
| Comp. Ex. 3 | — | — | — | — | — | — | — | — |
| Comp. Ex. 4 | 0.019 | 0.009 | 38 | 1.7 | 3.2 | 1.75 | 1.08 | 238 |

Example 9

As the electrolyte solution there was used a sulfuric acid-manganese sulfate mixed solution having a calcium concentration of 600 mg/L, a magnesium concentration of 1800 mg/L and a sulfuric acid concentration of 25.0 g/L. Electrolysis was carried out in the electrolyte solution while continuously adding to the electrolyte solution a feeding manganese sulfate solution with a manganese ion concentration of 43 g/L, and a slurry prepared by dispersing electrolytic manganese dioxide particles with a mean particle size of 0.63 μm at a concentration of 30 g/L, to produce electrolytic manganese dioxide.

The electrolysis was carried out while continuously adding the feeding manganese sulfate solution to the electrolyte solution for a sulfuric acid concentration of 25.0 g/L in the electrolyte solution, and continuously adding the slurry to the electrolyte solution for a manganese oxide particle concentration of 55 mg/L in the electrolyte solution. For the electrolysis, the electrolytic current density was 1.39 A/dm$^2$, the electrolysis temperature was 96° C., and the electrolysis period was 7 days.

The electrolytic manganese dioxide production conditions in Example 9 are shown in Table 5, and the evaluation results of the obtained electrolytic manganese dioxide are shown in Table 6. The electrolytic voltage upon completion of electrolysis in Example 9 was 2.75 V.

Example 10

As the electrolyte solution there was used a sulfuric acid-manganese sulfate mixed solution with a calcium concentration of 800 mg/L, a magnesium concentration of 1000 mg/L and a sulfuric acid concentration of 25 g/L. Electrolysis was carried out in the electrolyte solution while continuously adding to the electrolyte solution a feeding manganese sulfate solution with a manganese ion concentration of 42 g/L, and a slurry prepared by dispersing electrolytic manganese dioxide particles with a mean particle size of 0.8 μm, to produce electrolytic manganese dioxide.

The feeding manganese sulfate solution was continuously added to the electrolyte solution for a sulfuric acid concentration of 25.0 g/L in the electrolytic bath, and the electrolytic manganese dioxide particles were continuously added to the electrolyte solution for a manganese oxide particle concentration of 9.6 mg/L in the electrolyte solution.

The electrolytic current density was 1.5 A/dm$^2$, the electrolysis temperature was 96° C., and the electrolysis was conducted for an electrolysis period of 1 days, to obtain electrolytic manganese dioxide. The electrolytic voltage upon completion of electrolysis in Example 10 was 2.26 V.

The electrolytic manganese dioxide production conditions in Example 10 are shown in Table 5, and the evaluation results of the obtained electrolytic manganese dioxide are shown in Table 6.

Comparative Example 5

Electrolytic manganese dioxide was produced by the same method as Example 10, except that no manganese oxide was added to the electrolyte solution. The electrolytic manganese dioxide production conditions in Comparative Example 5 are shown in Table 5, and the evaluation results of the obtained electrolytic manganese dioxide are shown in Table 6.

TABLE 5

| | Sulfuric acid | | Electrolysis conditions | | | | |
| --- | --- | --- | --- | --- | --- | --- | --- |
| | Manganese ion concentration of replenishing manganese sulfate solution | concentration of sulfuric acid-manganese sulfate mixed solution | Alkaline earth metal concentration (mg/L) | | Electrolytic current density | Manganese oxide particle concentration | Electrolytic voltage at completion of electrolysis |
| | (g/L) | (g/L) | Ca | Mg | (A/dm$^2$) | (mg/L) | (V) |
| Example 9 | 43 | 25.0 | 600 | 1800 | 1.39 | 55 | 2.75 |
| Example 10 | 42 | 25.0 | 800 | 1000 | 1.5 | 9.6 | 2.26 |
| Comp. Ex. 5 | 42 | 25.0 | 800 | 1000 | 1.5 | — | 2.52 |

TABLE 6

| | Electrolytic manganese dioxide | | | | | | | | | |
| --- | --- | --- | --- | --- | --- | --- | --- | --- | --- | --- |
| | 2-200 nm pore volume | 2-50 nm pore volume | BET specific surface area | Bulk density | Apparent particle density | Alkaline earth metal concentration (ppm by wt.) | | FWHM | (110)/ (021) | Alkaline potential |
| | (cm$^3$/g) | (cm$^3$/g) | (m$^2$/g) | (g/cm$^3$) | (g/cm$^3$) | Ca | Mg | (deg.) | (—) | (mV) |
| Example 9 | 0.028 | 0.009 | 24 | 2.2 | 4.0 | 157 | 124 | 2.15 | 0.86 | 210 |
| Example 10 | 0.031 | 0.013 | 26 | 1.7 | 3.7 | 190 | 120 | 2.76 | 0.56 | 247 |
| Comp. Ex. 5 | 0.020 | 0.012 | 54 | 1.8 | 3.6 | 290 | 280 | 3.65 | 0.34 | 247 |

Example 11

Production of Lithium Manganate

The electrolytic manganese dioxide obtained in Example 1 was mixed with commercially available lithium carbonate and fired at 850° C. to produce lithium manganate. The obtained lithium manganate was molded at a pressure of 2 t/cm$^2$ to fabricate a compact. The molding density of the compact was 2.7 g/cm$^3$, and the lithium manganate had a high packing property. Also, when three samples were separated off from the lithium manganate and each sample was subjected to compositional analysis, all of the samples were found to have the same compositional ratio of Li, thereby confirming that the electrolytic manganese dioxide of the invention had uniformly reacted with the lithium compound.

(Measurement of Energy Density)

A lithium ion secondary battery was fabricated using the obtained lithium manganate, and its energy density was measured. The lithium ion secondary battery was fabricated using the lithium manganate obtained in the examples as the positive electrode active material, lithium metal as the negative electrode, and an ethylene carbonate/dimethyl carbonate (volume ratio=1:2) mixed solution comprising 1 mol/L lithium hexafluorophosphate (LiPF$_6$) as the electrolyte solution.

The fabricated lithium ion secondary battery was used for charge-discharge, and the energy density was calculated from the discharge capacity and the mean voltage during discharge. The charge-discharge current was at 1 C rate, and the charge-discharge voltage was set between 3 V and 4.3 V (charge: 3 V→4.3 V, discharge: 4.3 V→3 V). As a result, the energy density of the lithium manganate of Example 11 was 445 mWh/g. The results are shown in Table 7.

Example 12

The electrolytic manganese dioxide obtained in Example 2 was mixed with lithium carbonate and fired at 850° C. to produce lithium manganate. The obtained lithium manganate was molded at a pressure of 2 t/cm$^2$ to fabricate a compact. The molding density of the compact was 2.72 g/cm$^3$, and the lithium manganate had a high packing property. Also, when three samples were separated off from the obtained lithium manganate and each sample was subjected to compositional analysis, all of the samples were found to have the same compositional ratio of Li, thereby confirming that the electrolytic manganese dioxide of the invention had uniformly reacted with the lithium compound.

The energy density was measured by the same method as Example 11, except that the obtained lithium manganate was used as the positive electrode active material. As a result, the energy density of the lithium manganate of Example 12 was 448 mWh/g. The results are shown in Table 7.

Comparative Example 6

The electrolytic manganese dioxide obtained in Comparative Example 1 was mixed with lithium carbonate and fired at 850° C. to produce lithium manganate. The obtained lithium manganate was molded at a pressure of 2 t/cm$^2$ to fabricate a compact. The molding density of the compact was 2.73 g/cm$^3$, and the packing property was higher than the lithium manganates of Examples 11 and 12. The energy density was measured by the same method as Example 11, except that the obtained lithium manganate was used as the positive electrode active material. As a result, the energy density of the lithium manganate of Comparative Example 6 was 432 mWh/g. The results are shown in Table 7.

Thus, it was confirmed that the lithium manganate obtained from the electrolytic manganese dioxide of Comparative Example 1 had a high density of the compact, but that the energy density was lower than the lithium manganates obtained from the electrolytic manganese dioxides of Examples 11 and 12.

TABLE 7

|  | Molding density (g/cm³) | Energy density (mWh/g) |
|---|---|---|
| Example 11 | 2.7 | 445 |
| Example 12 | 2.72 | 448 |
| Comp. Example 6 | 2.73 | 432 |

The invention has been described in detail by specific embodiments, but it will be readily apparent to a person skilled in the art that various modifications and alterations may be implemented such as do not depart from the scope of the gist of the invention.

Moreover, the entirety of the specification, claims, drawings and abstract of Japanese Patent Application No. 2011-033249, filed on Feb. 18, 2011, is incorporated by reference in this disclosure of the present invention.

EXPLANATION OF SYMBOLS

1: Electrolytic manganese dioxide (particles), 2: pores (pore diameter≥200 nm) in electrolytic manganese dioxide, 3: pores (pore diameter<200 nm) in electrolytic manganese dioxide), 4: mercury (Hg).

The invention claimed is:

1. An electrolytic manganese dioxide having a BET specific surface area of between 20 m²/g and 60 m²/g, and having a volume of at least 0.023 cm³/g and 0.05 cm³/g at most for pores with pore diameters of between 2 nm and 200 nm, and further having a volume of at least 0.004 cm³/g and 0.03 cm³/g at most for pores with pore diameters of between 2 nm and 50 nm, wherein the apparent particle density is at least 3.4 g/cm³.

2. The electrolytic manganese dioxide according to claim 1, having a volume of at least 0.025 cm³/g for pores with pore diameters of between 2 nm and 200 nm.

3. The electrolytic manganese dioxide according to claim 1, having a volume of at least 0.005 cm³/g for pores with pore diameters of between 2 nm and 50 nm.

4. The electrolytic manganese dioxide according to claim 1, wherein the apparent particle density is at least 3.8 g/cm³.

5. The electrolytic manganese dioxide according to claim 1, wherein the bulk density is at least 1.5 g/cm³.

6. The electrolytic manganese dioxide according to claim 1, wherein the alkaline earth metal content is no greater than 500 ppm by weight.

7. A method for producing the electrolytic manganese dioxide according to claim 1, comprising a step of suspending manganese oxide in a sulfuric acid-manganese sulfate mixed solution to obtain electrolytic manganese dioxide,
wherein manganese oxide particles are continuously mixed with a sulfuric acid-manganese sulfate mixed solution in the step, for a manganese oxide particle concentration of between 5 mg/L and 200 mg/L in the sulfuric acid-manganese sulfate mixed solution.

8. The method for producing the electrolytic manganese dioxide according to claim 7, wherein the sulfuric acid concentration in the sulfuric acid-manganese sulfate mixed solution in the step is between 20 g/L and 30 g/L.

9. The method for producing the electrolytic manganese dioxide according to claim 7, wherein the electrolytic current density in the step is between 0.8 A/dm² and 1.5 A/dm².

10. The method according to claim 7, wherein the electrolytic current density in the step is between 1.2 A/dm² and 1.4 A/dm².

11. The method for producing the electrolytic manganese dioxide according to claim 7, wherein the mean particle size of the manganese oxide particles is no greater than 5 μm.

12. The method for producing the electrolytic manganese dioxide according to claim 7, wherein the alkaline earth metal concentration of the sulfuric acid-manganese sulfate mixed solution is at least 0.5 g/L.

13. A method for producing a lithium-manganese complex oxide, comprising a step of mixing the electrolytic manganese dioxide according to claim 1 with a lithium compound and heat treating the mixture to obtain a lithium-manganese complex oxide.

\* \* \* \* \*